US008828283B2

(12) United States Patent
Hattori et al.

(10) Patent No.: US 8,828,283 B2
(45) Date of Patent: Sep. 9, 2014

(54) METHOD OF PRODUCING A SHAPED ARTICLE FOR USE AS AN OPTICAL COMPONENT

(75) Inventors: Toshiaki Hattori, Otake (JP); Yoshihiro Uozu, Kawasaki (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 487 days.

(21) Appl. No.: 12/938,243

(22) Filed: Nov. 2, 2010

(65) Prior Publication Data

US 2011/0042838 A1 Feb. 24, 2011

Related U.S. Application Data

(60) Division of application No. 11/494,627, filed on Jul. 28, 2006, now abandoned, which is a continuation of application No. PCT/JP2005/001221, filed on Jan. 28, 2005.

(30) Foreign Application Priority Data

Jan. 30, 2004 (JP) ................................. 2004-024354

(51) Int. Cl.
  *B29D 11/00* (2006.01)
(52) U.S. Cl.
  USPC ......... 264/1.36; 264/1.37; 264/1.38; 264/1.7; 264/496
(58) Field of Classification Search
  USPC ........ 264/1.1, 1.36, 1.38, 1.7, 1.37, 494, 496; 425/174.4
  See application file for complete search history.

(56) References Cited

U.S. PATENT DOCUMENTS

| 5,726,730 A | 3/1998 | Crawford et al. |
| 5,922,251 A * | 7/1999 | Kobayashi et al. ............ 264/2.1 |
| 6,294,313 B1 * | 9/2001 | Kobayashi et al. ........... 430/302 |

FOREIGN PATENT DOCUMENTS

| JP | 03-087701 A | 4/1991 |
| JP | 03-284702 A | 12/1991 |
| JP | 06-235802 A | 8/1994 |
| JP | 11-287906 A | 10/1999 |
| JP | 2000-35576 A | 2/2000 |
| JP | 2000-329920 A | 11/2000 |
| JP | 2003-119623 A | 4/2003 |
| TW | 472162 B | 1/2002 |
| TW | 200305597 A | 11/2003 |

OTHER PUBLICATIONS

Taiwanese Office Action corresponding with Taiwanese Patent Application 094102604 dated Mar. 9, 2011.
Supplementary European Search Report dated Sep. 23, 2011, corresponding with European Patent Application 05709447.6.

* cited by examiner

*Primary Examiner* — Mathieu D. Vargot
(74) *Attorney, Agent, or Firm* — Fitch, Even, Tabin & Flannery LLP (57) ABSTRACT

An optical component and a method of producing the same, which optical component is obtained by photopolymerizing a photopolymerizable composition so as to comprise a matrix and numerous columnar structure bodies oriented in one direction within the matrix, wherein the columnar structure bodies differ in refractive index from the matrix and are arrayed in a lattice in the plane perpendicular to said orientation direction to have a highly arrayed structure whose refractive index periodically changes on the order of 80 nm to 1,000 micrometer. The optical component according to the invention is imparted with a structure whose refractive index periodically changes with high regularity on the order of about 80 nm to 1,000 micrometer and, owing to this property, is usable in optical sheet, optical film and other ordinary optical applications.

17 Claims, 12 Drawing Sheets

FIG.18

METHOD OF PRODUCING A SHAPED ARTICLE FOR USE AS AN OPTICAL COMPONENT

CROSS REFERENCE TO RELATED APPLICATION

This application is a Divisional Patent Application of U.S. application Ser. No. 11/494,627, filed Jul. 28, 2006, now abandoned, which is a Continuation Patent Application of PCT International Application No. PCT/JP2005/001221 filed Jan. 28, 2005, and claims the priority from Japanese Application No. 2004-024354 filed Jan. 30, 2004, the complete disclosures of which are incorporated herein by reference.

BACKGROUND OF THE INVENTION

This invention relates to a shaped article for use as an optical component and a method of producing the shaped article, particularly to a shaped article for use as an optical component such as an optical sheet or optical film having diffraction, polarization, diffusion or other optical property, and a method of producing the shaped article.

An example of the shaped article for use as an optical component of the invention is the optical low-pass filter for suppressing the occurrence of moiré fringes in an image pickup device used in a CCD detector.

DESCRIPTION OF THE PRIOR ART

Components made of plastic film or sheet in which portions of different optical property are arrayed to have one- or two-dimensional regularity are being studied for use as optical control panels and other optical components.

For instance, an arrayed configuration imparting two-dimensional regularity has been described in *Macromolecules*, which gives an example of arraying block polymers regularly within the plane perpendicular to the sheet thickness direction (see *Macromolecules* 2003, 36, 3272-3288; Ref. No. 1).

In addition, Japanese Patent Unexamined Publication No. 63-309902 (Ref. No. 2), for example, teaches an arrayed configuration imparting one-dimensional regularity. The disclosed configuration is obtained by exposing a membranous UV-curable composition to ultraviolet rays at a prescribed angle to cure the UV-curable composition, next holding a second UV-curable composition on the cured UV-curable composition, and curing the second UV-curable composition in this state by exposing it to ultraviolet rays at another angle, thereby overlaying portions of different optical property in a direction perpendicular to the sheet thickness direction.

Non Patent Document 1: *Macromolecules* 2003, 36, 3272-3288; Ref. No. 1 Patent Document 1: Japanese Patent Unexamined Publication No. 63-309902; Ref. No. 2

SUMMARY OF THE INVENTION

However, the structure set out in Ref. No. 1 has an array periodicity on the nanometer order and therefore cannot be used in ordinary optical applications requiring an array periodicity of around 80 nm to 1,000 micrometer.

Although the structure set forth in Ref. No. 2 has micro-order regularity, the array accuracy is low and is therefore not suitable for use in optical applications requiring high-level optical control.

This invention was accomplished for overcoming these problems of the prior art and has as its object to provide a shaped article for use as an optical component and a method for producing the same, which shaped article for use as an optical component is imparted with a structure whose refractive index periodically changes with high regularity on the order of about 80 nm to 1,000 micrometer.

This invention provides a shaped article for use as an optical component obtained by photopolymerizing a photopolymerizable composition so as to comprise a matrix and numerous columnar structure bodies (domains) oriented in one direction within the matrix, wherein the columnar structure bodies differ in refractive index from the matrix and are arrayed in a lattice in a plane perpendicular to said orientation direction to have a highly arrayed structure whose refractive index periodically changes on the order of 80 nm to 1,000 micrometer.

In accordance with a preferred aspect of the invention, the diameter of the columnar structure bodies is not less than 80 nm and not greater than 1,000 micrometer.

In accordance with another preferred aspect of the invention, the array periodicity of the columnar structure bodies is not less than 80 nm and not greater than 1,000 micrometer.

In accordance with another aspect, the invention provides a method of producing a shaped article for use as an optical component comprising a step of injecting into a cell a photopolymerizable composition containing a multifunctional monomer or oligomer comprising two or more functions and a photopolymerization initiator and a step of directing parallel rays onto the photopolymerizable composition, thereby polymerization-curing the photopolymerizable composition to form a shaped article for use as an optical component composed of a matrix and numerous columnar structure bodies arrayed in one direction within the matrix.

When the parallel rays are directed onto the photopolymerizable composition in accordance with this method, a periodic change in refractive index is produced in the photopolymerizable composition and, as a result, the photopolymerizable composition is polymerized into a shaped article for use as an optical component composed of a matrix and numerous columnar structure bodies arrayed in one direction within the matrix. An optical sheet, optical film or other such shaped article for use as an optical component that is capable of high-level optical control can therefore be obtained without need for complicated steps.

In accordance with another preferred aspect of the invention, the full width at half maximum of the parallel rays is not greater than 100 nm.

In accordance with another preferred aspect of the invention, the optical intensity distribution of the parallel rays is substantially constant.

In accordance with another aspect, the invention provides a shaped article for use as an optical component obtained by photopolymerizing a photopolymerizable composition, which when exposed to a laser beam produces a diffraction pattern due to a periodic change in refractive index imparted to the shaped article.

This invention provides a shaped article for use as an optical component and a method for producing the same, which is imparted with a structure whose refractive index periodically changes with high regularity on the order of about 80 nm to 1,000 micrometer and, owing to this property, is usable as an optical sheet, optical film and other ordinary optical applications.

DESCRIPTION OF THE PREFERRED EMBODIMENT

Figure 1:
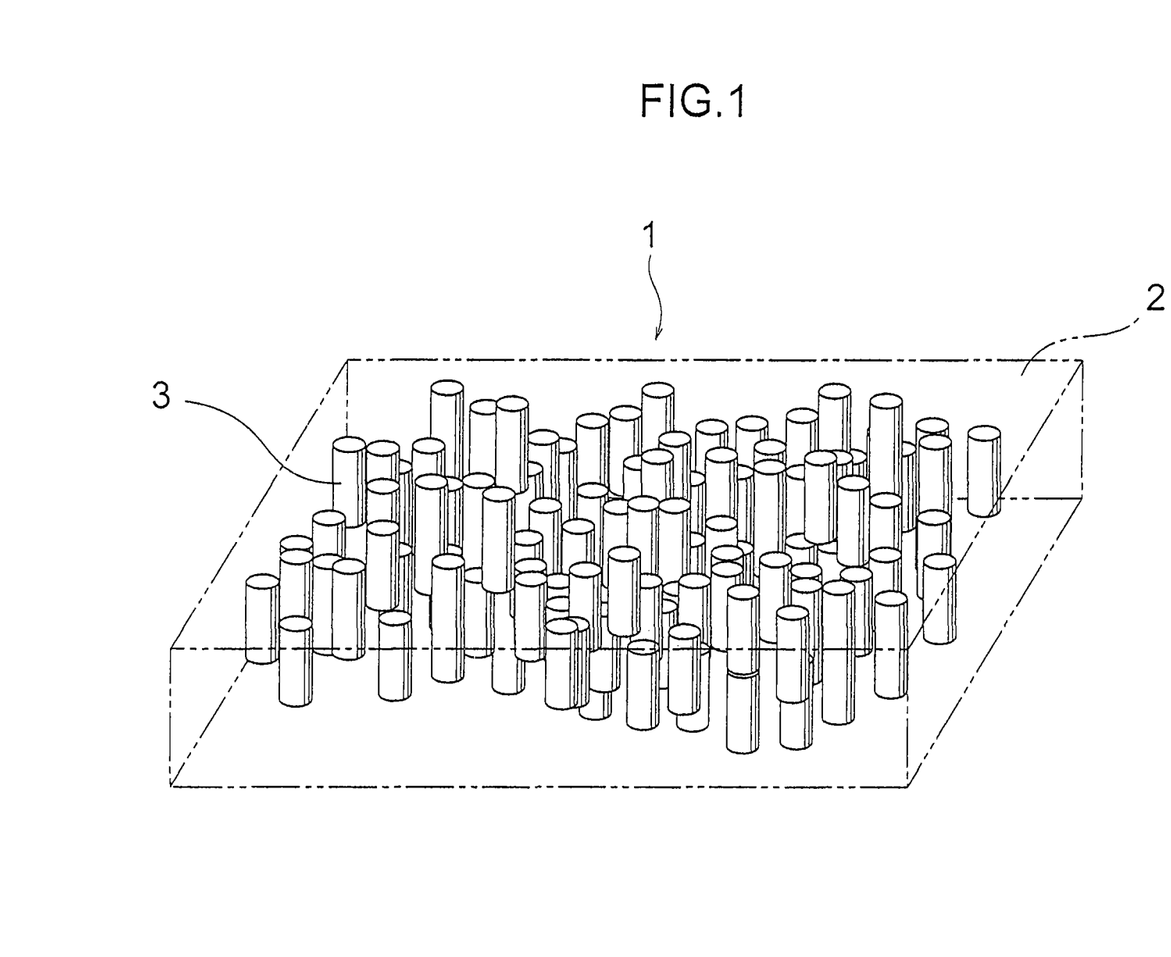
FIG. 1 is a schematic view of a shaped article according to the invention.

FIG. 1 a schematic view of the arrayed structure of a shaped article 1 according to a preferred embodiment of the invention. The shaped article 1 is intended for use as an optical component. As shown in FIG. 1, the shaped article 1 comprises a sheet- or film-like matrix 2 and numerous columnar structure bodies 3 arranged within the matrix 2. The columnar structure bodies 3 differ from the matrix 2 in refractive index and are oriented in one direction (thickness direction of the of the matrix 2) and regularly arrayed. In this embodiment, the array periodicity of the columnar structure bodies 3 is set at 80 nm to 1,000 micrometer, preferably 90 nm to 5,000 nm, more preferably 100 nm to 500 nm.

The diameter of the columnar structure bodies 3 (the circumscribed circle diameter in the case of prismatic columnar structure bodies) is 80 nm to 1,000 micrometer, preferably 90 nm to 5,000 nm, more preferably 100 nm to 500 nm.

When the array periodicity or diameter of the columnar structure bodies 3 is less than 80 nm or larger than 1,000 micrometer, no optical function is exhibited because the interference effect with respect to light in the wavelength range of 350 nm to 2,000 nm is weak. In this embodiment, the diameter of the columnar structure bodies 3 is therefore defined as 80 nm to 1,000 micrometer in order to obtain the diffraction, polarization and other optical properties required by ordinary optical components.

The shaped article 1 therefore has a structure whose refractive index periodically changes with high regularity on the order of 80 nm to 1,000 micrometer. Because of its high-optical control capability, the shaped article of this configuration is suitable for ordinary optical applications, particularly for use as various kinds of optical components such as optical sheet and optical film.

The shaped article 1 is formed by injecting a photopolymerizable composition into a prescribed cell and polymerization-curing the photopolymerizable composition by exposing it to light. The photopolymerizable composition used contains a multifunctional monomer or oligomer comprising two or more functions and a photopolymerization initiator.

Owing to the inclusion of the monomer comprising two or more functions in the composition, densification and rarefaction of the polymerization degree (crosslink density) tends to occur in the plane perpendicular to the thickness direction of the photopolymerizable composition during the polymerization-curing. The regions where the polymerization degree (crosslink density) is dense have a higher refractive index than the regions where it is rare. When such a high-low refractive index pattern is established, the high refractive index regions assume a waveguide mode, whereby more light passes through the high refractive index regions.

It is thought, therefore, that downward of the regions where the polymerization degree (crosslink density) is dense and refractive index high, the photoreaction of the photocurable composition proceeds with still more pronounced densification and rarefaction of the polymerization degree (crosslink density). And this phenomenon is believed to form within the matrix 2 numerous columnar structure bodies 3 whose refractive index differs from that of the matrix.

The multifunctional monomer comprising two or more functions is limited only in that it must be a monomer that, for example, has two or more polymerizable carbon-to-carbon double bonds in the molecule. However, among such monomers, ones including a (metha)acryloyl group, vinyl group, acryl group or the like are particularly preferable.

Specific examples of such multifunctional monomers comprising two or more functions include triethylene glycol di(metha)acrylate, polyethylene glycol di(metha)acrylate, neopentylglycol di(metha)acrylate, 1,4-butanediol di(metha)acrylate, 1,6-hexanediol di(metha)acrylate, hydro-dicyclo-penta-dienyl di(metha)acrylate, ethylene oxide-modified bisphenol A di(metha)acrylate, trimethylolpropane tri(metha)acrylate, pentaerythritol tetra(metha)acrylate, tetramethylolmethane tetra(metha) acrylate, pentaerythritol hexa(metha)acrylate, multifunctional epoxy(metha)acrylate, multifunctional urethane(metha)acrylate, divinylbenzene, triallyl cyanurate, triallyl isocyanurate triallyl trimellitate, diallyl chlorendate, N,N'-m-phenylene bismaleimide, and diallyl phthalate. These monomers can be used alone or in combinations of two or more.

When a multifunctional monomer having three or more polymerizable carbon-to-carbon double bonds in the molecule is used, the densification and rarefaction of the polymerization degree (crosslink density) is still stronger, so that the columnar structure bodies tend to form more easily.

Particularly preferable multifunctional monomers comprising three or more functions include trimethylolpropane tri(metha)acrylate, pentaerythritol tetra(metha)acrylate, tetramethylolmethane tetra(metha)acrylate, and pentaerythritol hexa(metha)acrylate.

In the case of using two or more multifunctional monomers or oligomers as the photopolymerizable composition, it is preferable to use ones whose individual polymers differ from one another in refractive index and still more preferably to combine ones whose polymers differ greatly from one another in refractive index.

The refractive index difference has to be made large in order to obtain diffraction, polarization, diffusion and other such functions at high efficiency. The refractive index difference is therefore preferably 0.01 or greater, more preferably 0.05 or greater.

When using two or more multifunctional monomers or oligomers, it suffices for the refractive index difference between at least two of their individual polymers to fall within the aforesaid range. In order to obtain highly efficient diffraction, polarization, diffusion and other functions, the two polymers or oligomers whose individual polymers have the greatest refractive index difference are preferably used in a weight ratio of 10:90 to 90:10.

In this embodiment, the photopolymerizable composition can also include, in addition to the aforesaid multifunctional monomers or oligomers, a monofunctional monomer or oligomer having a single polymerizable carbon-to-carbon double bond in the molecule.

Particularly preferable as such monofunctional monomers or oligomers are ones containing (metha)acryloyl group, vinyl group, acryl group of the like.

Specific examples of monofunctional monomers include, for example, methyl(metha)acrylate, tetrahydrofurfuryl (metha)acrylate, ethylcarbitol(metha)acrylate, dicyclopentenyloxyethyl(metha)acrylate, isobornyl(metha)acrylate phenylcarbitol(metha)acrylate, nonylphenoxyethyl(metha) acrylate, 2-hydroxy-3-phenoxypropyl(metha)acrylate, (metha)acryloyloxyethyl succinate, (metha)acryloxyethyl phthalate, phenyl(metha)acrylate, cyanoethyl(metha)acrylate, tribromophenyl(metha)acrylate, phenoxyethyl(metha) acrylate, tribromophenoxyethyl(metha)acrylate, benzyl (metha)acrylate, p-bromobenzyl(metha)acrylate, 2-ethylhexyl(metha)acrylate, lauryl(metha)acrylate, trifluoroethyl(metha)acrylate, 2,2,3,3-tetrafluoropropyl(metha) acrylate and other (metha)acrylate compounds; styrene, p-chlorostyrene, vinylacetate, acrylonitrile, N-vinylpyrrolidone, vinylnaphthalene and other vinyl compounds; and ethylene glycol bisallylcarbonate, diallyl phthalate, diallyl isophthalate. and other allyl compounds.

These monofunctional monomers and oligomers are used to impart flexibility to the shaped article. The multifunctional monomers and oligomers are preferably used in an amount in the range of 10 to 99 mass %, more preferably 10 to 50 mass %, of the total amount of multifunctional monomers and oligomers.

As the photopolymerizable composition can also be used a uniform dissolved mixture containing the multifunctional monomers or oligomers and a compound not possessing a polymerizable carbon-to-carbon double bond.

Usable compounds not possessing a polymerizable carbon-to-carbon double bond include, for example, polystyrene, poly(methyl methacrylate), polyethylene oxide, polyvinyl pyrrolidone, polyvinyl alcohol, nylon and other polymers; toluene, n-hexane, cyclohexane, acetone, methylethylketone, methyl alcohol, ethyl alcohol, acetic ester, acetonitrile, dimethylacetamide, dimethylformamide, tetrahydrofuran and other such monomeric compounds; and organic halogen compounds, organic silicon compounds, plasticizers, stabilizers and other such additives.

The compound not possessing a polymerizable carbon-to-carbon double bond is used to lower the viscosity of the photopolymerizable composition and make it easy to handle during production of the shaped article. The amount used is preferably in the range of 1 to 99 mass % of the total amount of multifunctional monomers and oligomers, and preferably in the range of 1 to 50% thereof for improving handleability while also ensuring formation of regularly arrayed columnar structure bodies.

In this embodiment, the photopolymerization initiator used in the photopolymerizable composition is not particularly limited and can be any of various types used in ordinary photopolymerization, i.e., polymeraization conducted by exposing a photopolymerizable composition to untraviolet or other actinic rays. Usable photopolymerization initiators include, for example, benzophenone, benzyl, Michler's ketone, 2-chlorothioxanthone, benzoinethylether, diethoxyacetophenone, p-t-butyltrichloroacetophenone, benzyldimethylketal, 2-hydroxy-2-methylpropiophenone, 1-hydroxy cyclohexylphenyl ketone, 2-benzyl-2-dimethylamino-1-(4-morpho-lenophenyl) butanone, dibenzosuberone and the like.

The amount of these photopolymerization initiators used is preferably in the range of 0.001 to 10 parts by weight per 100 parts by weight of the remainder of the photopolymerizable composition, and more preferably 0.001 to 5 parts by weight thereof from the viewpoint of preventing degradation of shaped article transparency.

As explained earlier, the shaped article 1 of this embodiment has numerous columnar structure bodies 3 differing in refractive index from the matrix 2 arranged within the matrix 2 to be oriented in one direction. The columnar structure bodies 3 are arranged to have two-dimensional regularity in the plane perpendicular to the orientation direction. The columnar structure bodies can be of any of various shapes including circular-cylindrical, elliptic-cylindrical and prismatic.

Figure 2:
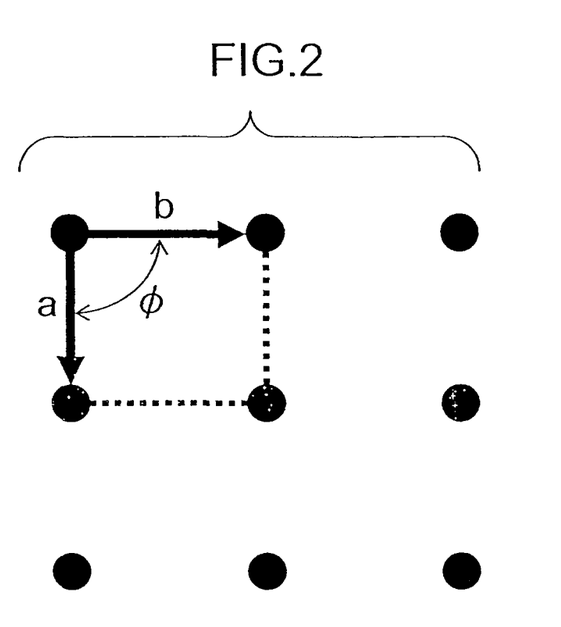
FIG. 2 is an explanatory view of a cubic lattice.
Figure 3:
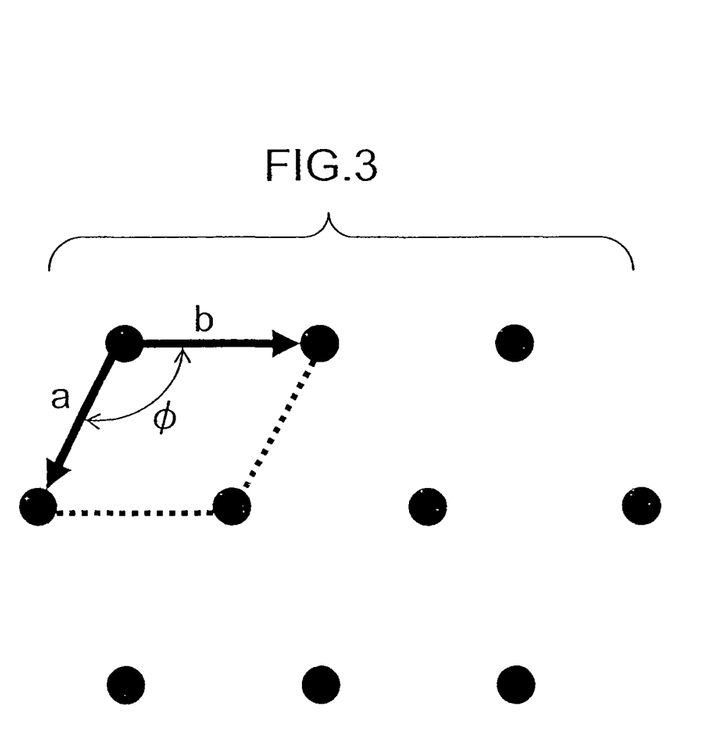
FIG. 3 is an explanatory view of a hexagonal lattice.
Figure 4:
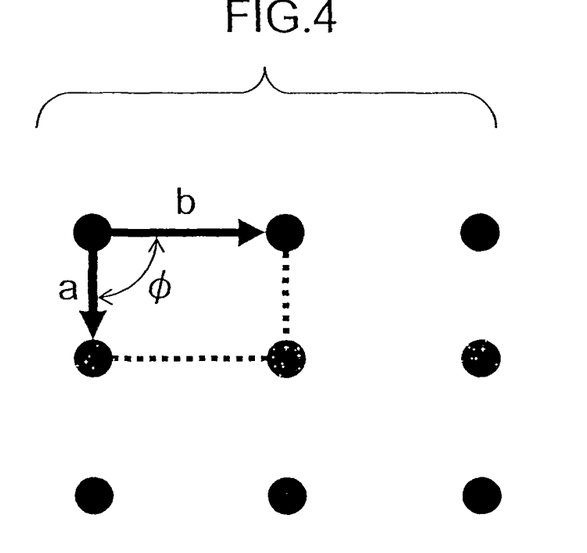
FIG. 4 is an explanatory view of a primitive rectangular lattice.
Figure 5:
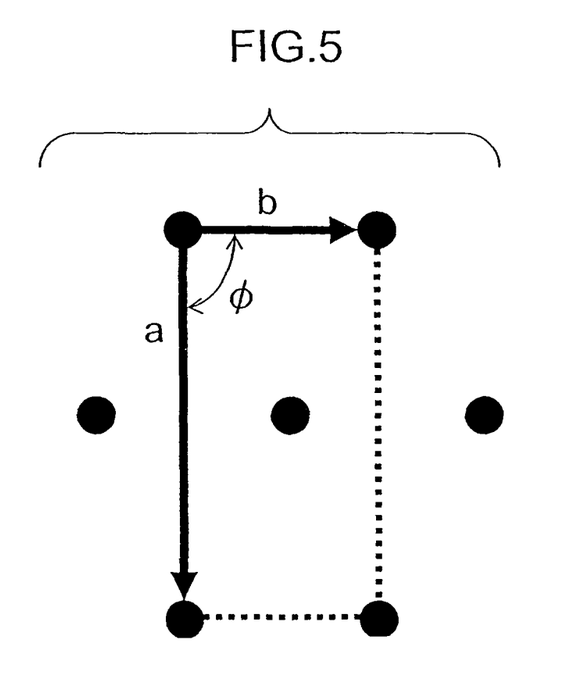
FIG. 5 is an explanatory view of a face-centered rectangular lattice.
Figure 6:
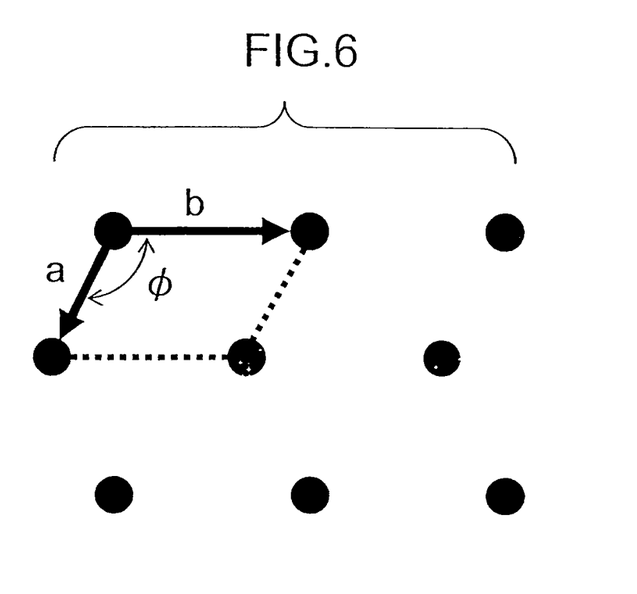
FIG. 6 is an explanatory view of an orthorhombic lattice.

The regularity is represented by a two-dimensional Bravais lattice generated by primitive translation vectors a, b. Specifically, in this embodiment, the unit lattice is one among the five lattices (cubic lattice, hexagonal lattice, primitive rectangular lattice, face-centered rectangular lattice, and orthorhombic lattice) shown in FIGS. 2 to 6. As shown in FIG. 2, these five unit lattices are represented by the magnitudes of their vectors a, b. and the angle φ therebetween.

Figure 7:
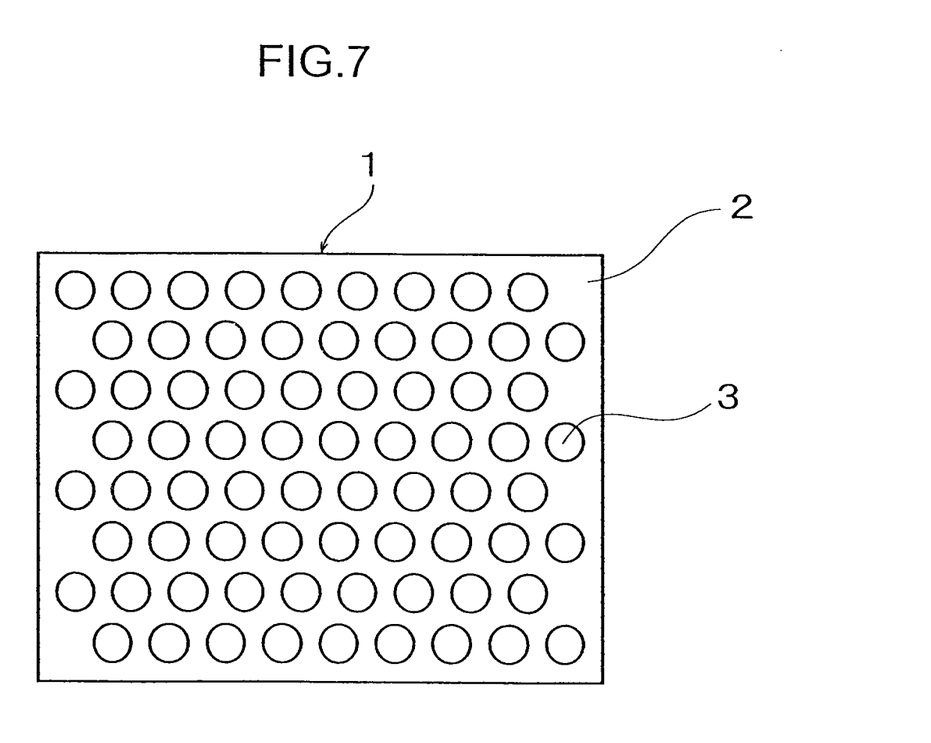
FIG. 7 a schematic view of a regular array of columnar structure bodies.

The cylindrical structure bodies arranged in a hexagonal lattice (the array of the columnar structure bodies 3 in the matrix 2 is shown schematically in FIG. 7) or a cubic lattice are preferable for use as optical low-pass filters that generate a triaxial or biaxial diffraction pattern and can achieve multiaxial separation in a single shaped article. The hexagonal lattice includes the triangular lattice and honeycomb lattice.

Figure 8:
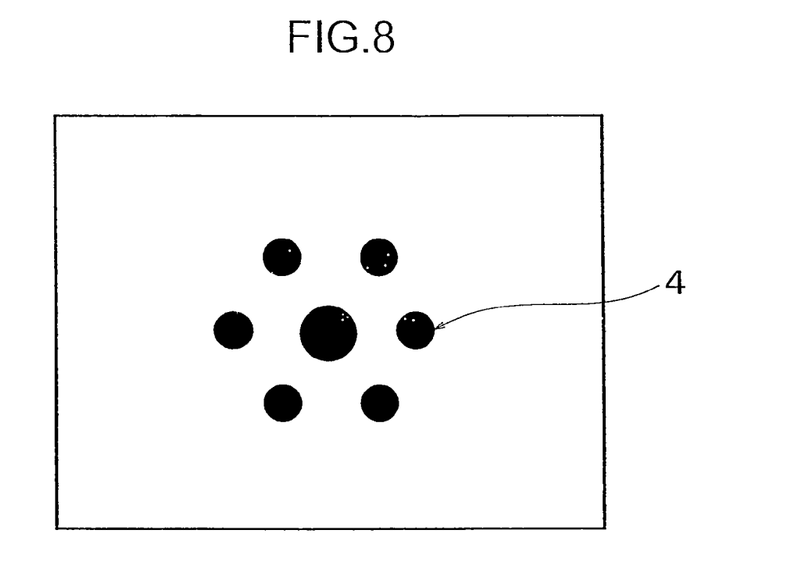
FIG. 8 is a schematic view of a primary diffraction pattern.

The regularity of the shaped article of this invention is preferably such as to provide up to the secondary diffraction pattern, but in some applications, such as polarization, need only provide up to the primary diffraction pattern 4 as shown in FIG. 8.

TABLE 1

| Lattice | Unit lattice axis |
| --- | --- |
| Cubic | $|a| = |b|, \varnothing = 90°$ |
| Hexagonal | $|a| = |b|, \varnothing = 120°$ |
| Primitive rectangular | $|a| \neq |b|, \varnothing = 90°$ |
| Face-centered rectangular | $|a| \neq |b|, \varnothing = 90°$ |
| Orthorhombic | $|a| \neq |b|, \varnothing = 90°$ |

Figure 9:
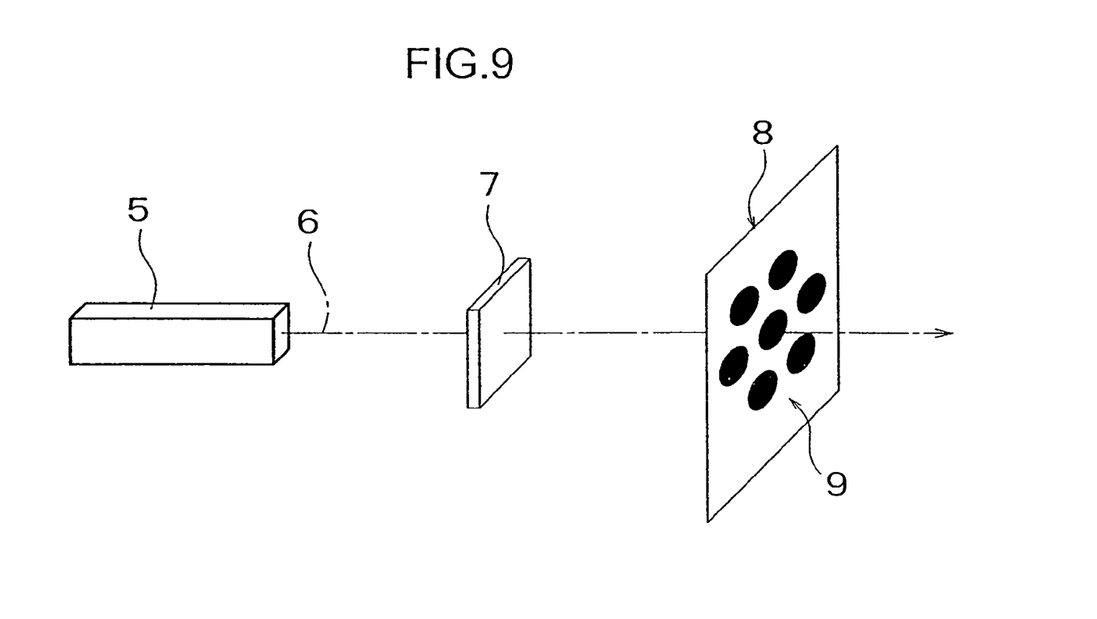
FIG. 9 is a schematic configuration diagram showing diffraction pattern measurement.

When the shaped article 1 of this embodiment is placed at the location of the specimen 7 in FIG. 9 and a laser beam 6 is directed from a laser beam source 5 the direction of the columnar structure body 3 orientation, a diffraction pattern 9 attributable to the regularity of the columnar structure bodies 3 is observed on a screen 8.

One method of evaluating high-order structure based on the crystallization or phase separation of a plastic film or other polymer solid is the light-scattering method of exposing the polymer solid to a laser beam and detecting the scattering pattern produced in accordance with the structure of the polymer solid.

Figure 10:
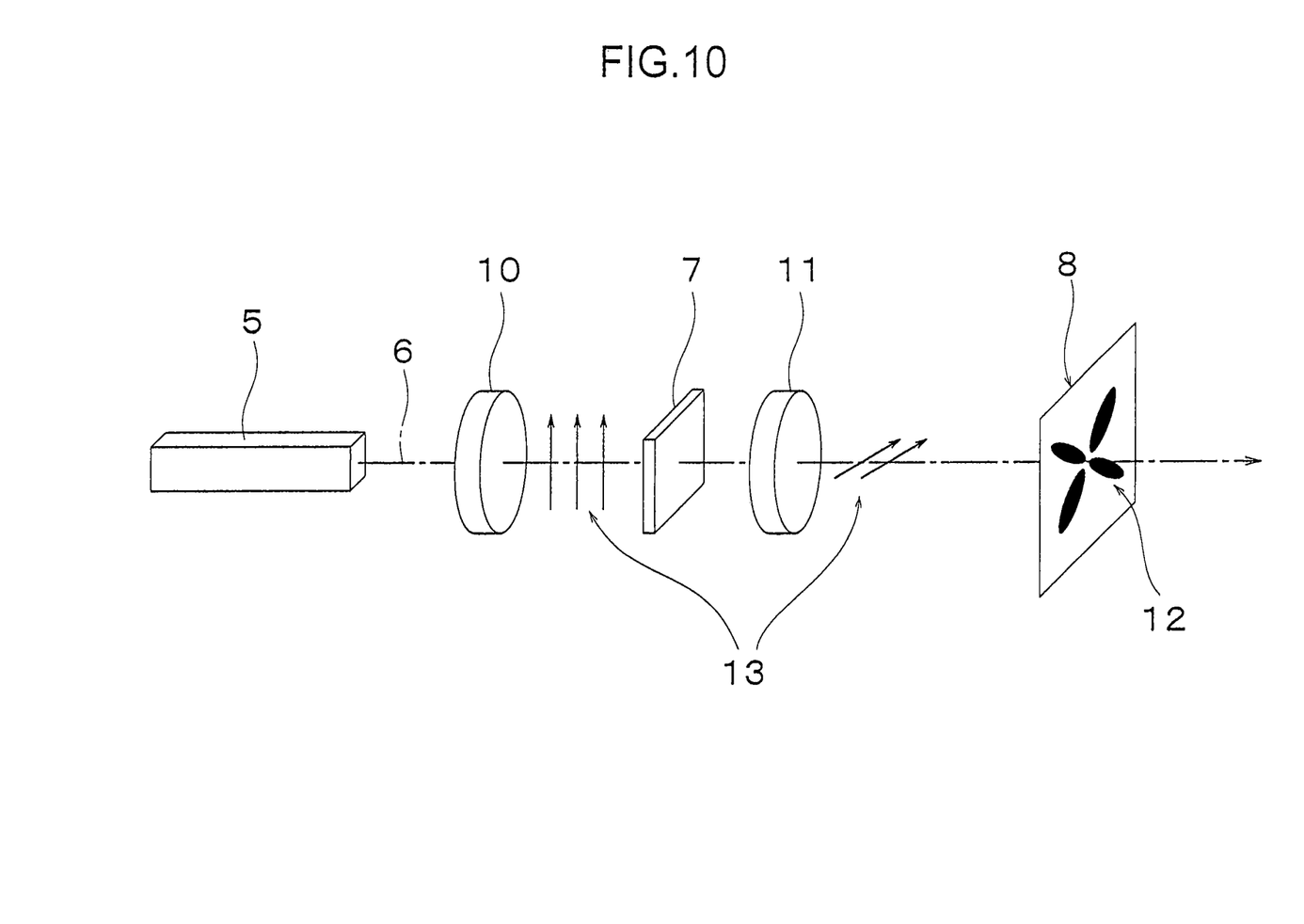
FIG. 10 is a schematic configuration diagram showing a light-scattering optical system.

FIG. 10 shows an optical system used in the light-scattering method. The laser beam 6 from the laser beam source 5 is directed through a polarizing element 10 onto the specimen 7 and the scattered light resulting from the internal structure of the specimen 7 is passed through an analyzer 11 and projected onto the rearward screen 8 for observation of a scattering pattern 12. The arrows 12 in the drawing indicate the polarization direction of the light after passing through the polarizing element 10 and analyzer 11.

An optical system whose polarization directions are perpendicular to each other as shown in FIG. 10 is called an Hv scattering optical system, and one whose polarization directions are parallel is called a Vv scattering optical system. Information regarding the optical anisotropy of the specimen can be obtained from the Hv scattering, while information regarding the density fluctuation and optical anisotropy of the specimen can be obtained from the Vv scattering.

When the light-scattering pattern of polyethylene, which is known to be a crystalline polymer, is observed by such an optical system, the clover-shaped scattering pattern 12 of FIG. 10 is observed because polyethylene is composed of spherical crystals having radial optical anisotropy.

Figure 14:
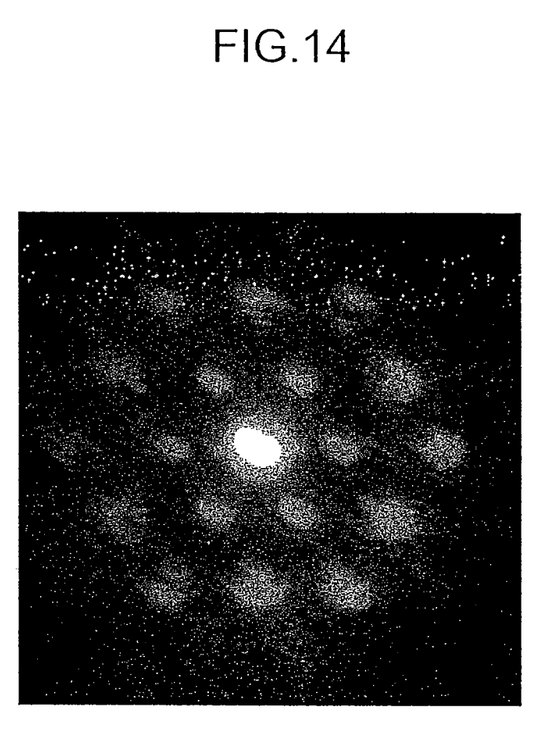
FIG. 14 is a photograph showing a diffraction spot observed for a shaped article of the invention.

In contrast, when an optical system like that of FIG. 10 but with the analyzer 11 removed is used to, project on the screen 8 the scattering pattern of the shaped article of this embodiment having the cylindrical structure bodies regularly arrayed in a hexagonal lattice or cubic lattice on the order of not less than 80 nm and not greater than 1,000 micrometer, a diffraction pattern is obtained owing to the interference effect caused by the regular arrangement of the cylindrical structure bodies. With regard to this invention, a diffraction pattern is said to be obtained when a diffraction pattern such as shown in FIG. 14 is observed.

The shaped article 1 of the invention ordinarily takes the form of a sheet or film suitable for use as an optical component but is not limited thereto.

The method of producing the shaped article 1 of this embodiment will now be explained. FIG. 11(a) is a plan view of a cell 14 and FIG. 11(b) is a sectional view thereof.

The upper cover 15 of the cell 14 and other members positioned on the light source side are made of optically transparent material that does not optically absorb incident light. Specific materials that can be used include Pyrex (registered trademark) glass and quartz glass, and transparent plastic materials like fluorine-containing (metha)acrylic resin.

Figure 11:
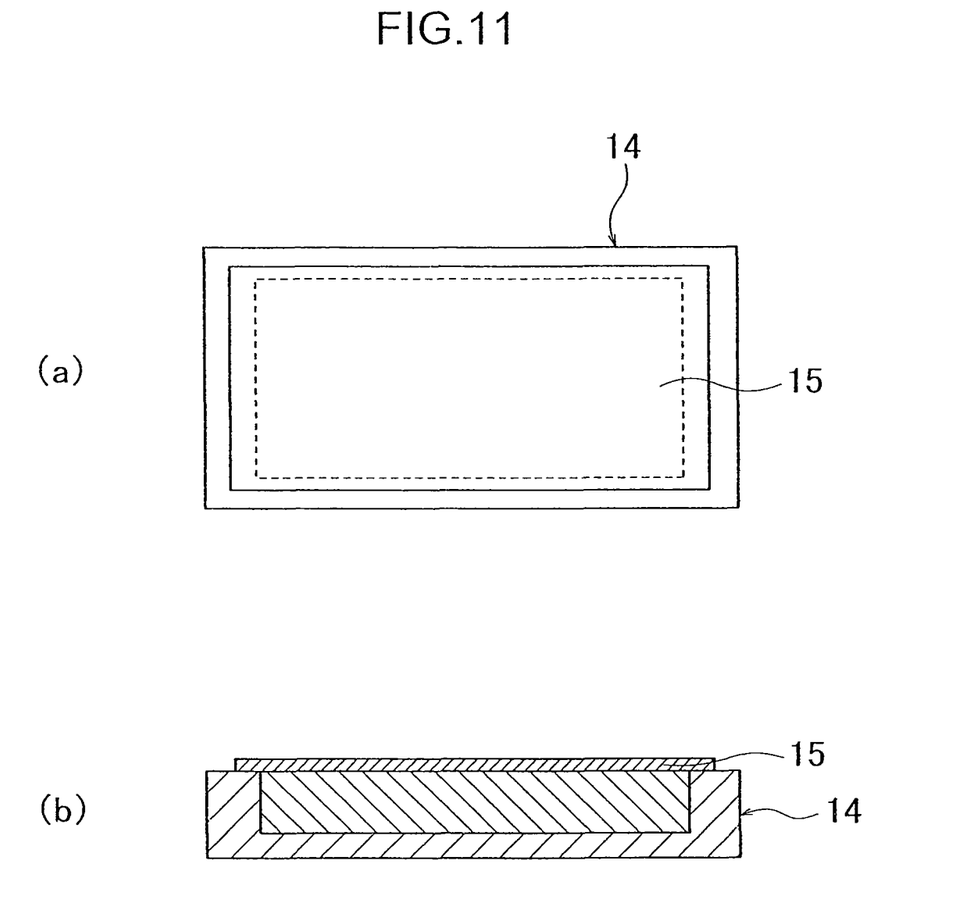
FIGS. 11(a) and 11(b) are a plan view and a sectional view showing the structure of a cell for producing the shaped article of this invention.

The cell 14 can be variously modified in shape in accordance with the shape of the shaped article to be formed. The rectangular shape shown in FIG. 11 is only one example. When a film-like shaped article is to be produced, for example, the cell 14 can be fabricated by forming a gap between two glass plates, in which case the photopolymerizable mixture is retained in the gap.

In this embodiment, the cell 14 is preferably hermetically sealed to prevent the photopolymerizable composition from coming in contact with air, so that the photopolymerization can proceed unhindered.

First, the photopolymerizable composition is charged into the void region of the cell 14. Next, the photopolymerizable composition sealed in the cell 14 is exposed to parallel ultraviolet rays or the like to polymerization-cure the photopolymerizable composition. In order to ensure regular arraying of the columnar structure bodies, it is preferable at this time for the optical intensity distribution of the parallel rays to be substantially constant in the plane perpendicular to the direction of light travel.

The light source is preferably one that uses a mirror, lens or the like to convert light from a spot light source into parallel rays of substantially constant optical intensity distribution (top hat distribution), a surface-emitting semiconductor laser (VCSEL), or other such surface-emitting light source.

From the viewpoint of ensuring that the columnar structure bodies are formed in a regular array, the parallelism of the incident light should preferably be such that the beam spread angle is not greater than ±0.03 rad, more preferably in the range of not greater than ±0.001 rad. Although a laser beam is preferable in the point of high parallelism, the optical intensity distribution of the beam is Gaussian and should preferably be made substantially constant by means of an appropriate filter or the like during use.

In order to array the columnar structure bodies with high regularity in the shaped article, the polymerization reaction should preferably proceed uniformly in the plane perpendicular to the film thickness direction of the shaped article. For this, the optical intensity measured at multiple points within the exposed area (points I to IX shown in FIG. 12) is preferably such that the illumination distribution given by Equation (1) below is not greater than 2.0%, more preferably not greater than 1.0%.

Figure 12:
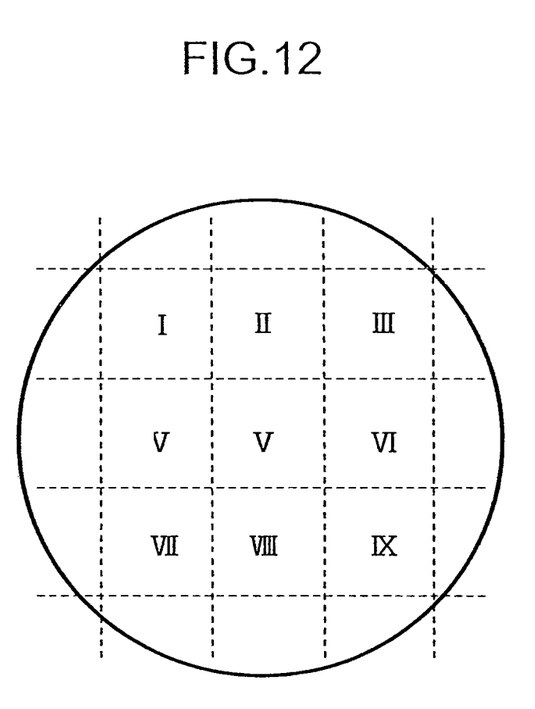
FIG. 12 is a diagram showing measurement points for measurement of actinic intensity distribution.

Illumination distribution=(max value−min value)/
(max value+min value)×100      Eq. (1)

In addition, the regularity of the columnar structure body array improves with shorter wavelength of the incident light. The full width at half maximum of the parallel rays should therefore be not greater than 100 nm, preferably not greater than 20 nm.

EXAMPLES

The present invention will now be explained with reference to specific examples. However, it should be noted that the present invention is in no way limited to the details of the described arrangements.

Example 1

The photopolymerizable composition used was prepared by mixing 50 parts by mass of methymethacylate having a refractive index of 1.489 as an independent polymer and 50 parts by mass of trimethylolpropane triacrylate having a refractive index of 1.535 as an independent polymer and dissolving in the mixture 1 part by mass of 1-hydroxy cyclohexylphenyl ketone as photopolymerization initiator.

The obtained photopolymerizable composition was sealed film-like in a glass cell that resembled the one shown in FIG. 11 and measured 50 mm×50 mm and 0.1 mm in thickness. Next, an ultraviolet beam having a beam spread angle of not greater than ±0.001 rad and an illumination distribution in its optical intensity distribution in the plane perpendicular to the direction of light travel of not greater than 2.0% was directed perpendicularly onto the surface of the upper cover 15, thereby polymerization-curing the photopolymerizable composition to produce a plastic film.

Figure 13:
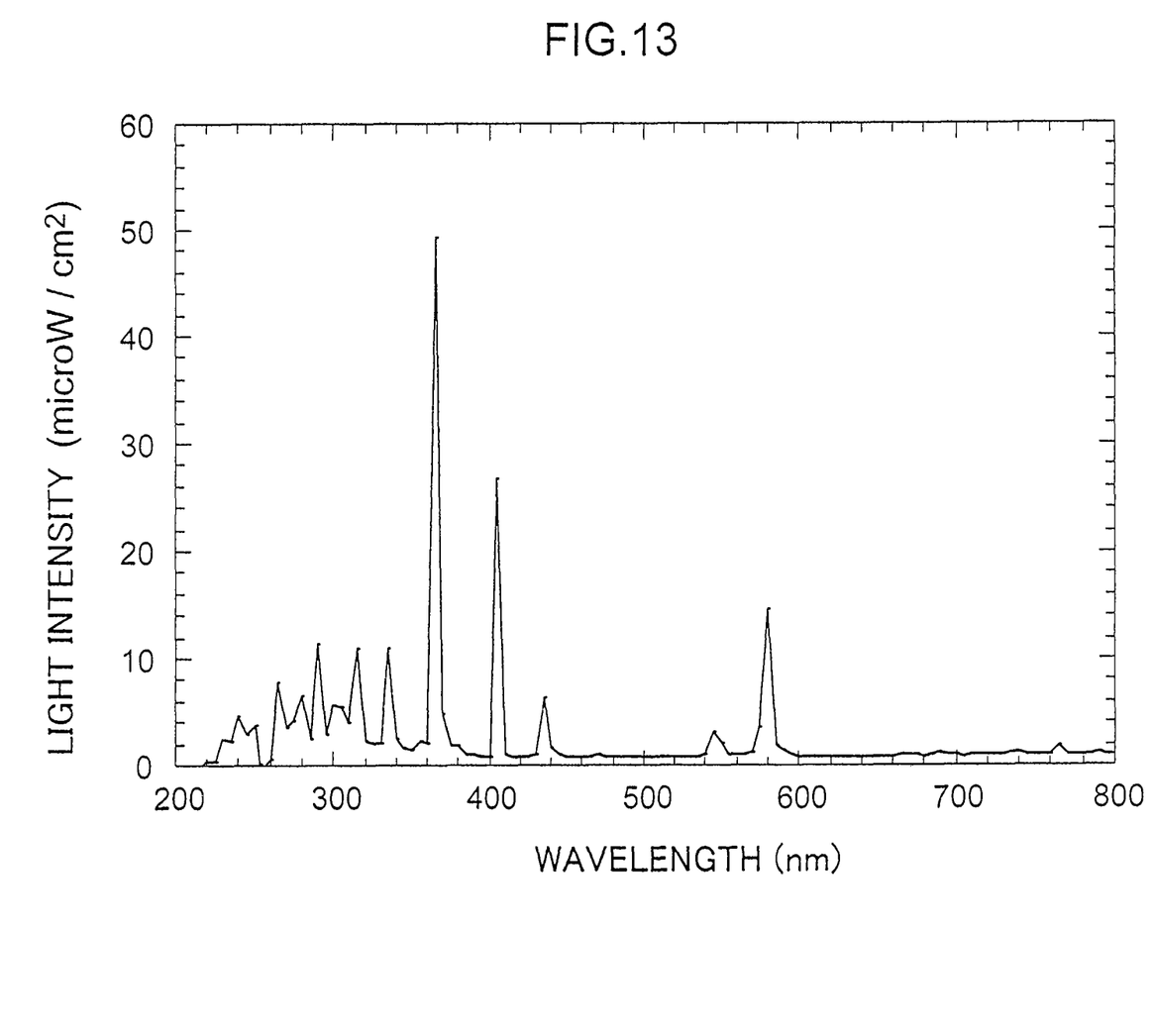
FIG. 13 is a diagram showing the emission spectrum of an ultra-high pressure mercury lamp used in the invention.

The light source used was a parallel ray ultraviolet irradiator equipped with an ultra-high pressure mercury lamp having an emission spectrum like that shown in FIG. 13. A monochromatic beam having a center wavelength of 365 nm and a full width at half maximum of 10 nm was extracted by means of an interference filter and used as the irradiation light.

Figure 15:
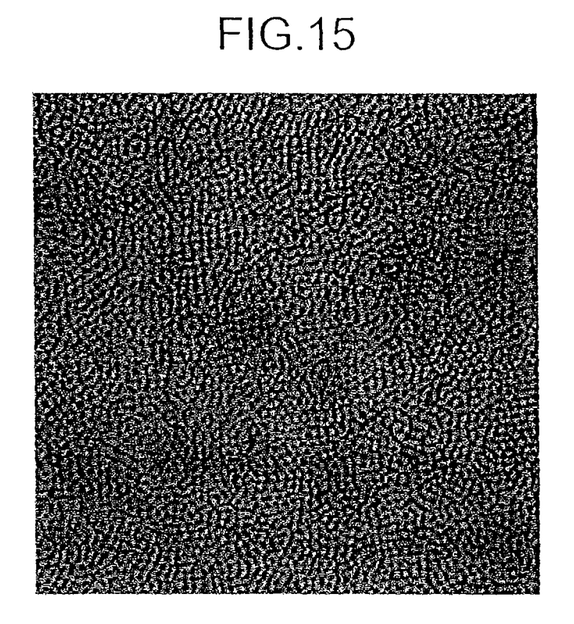
FIG. 15 is a photograph showing a polarization microscope image of a shaped article of the invention.
Figure 16:
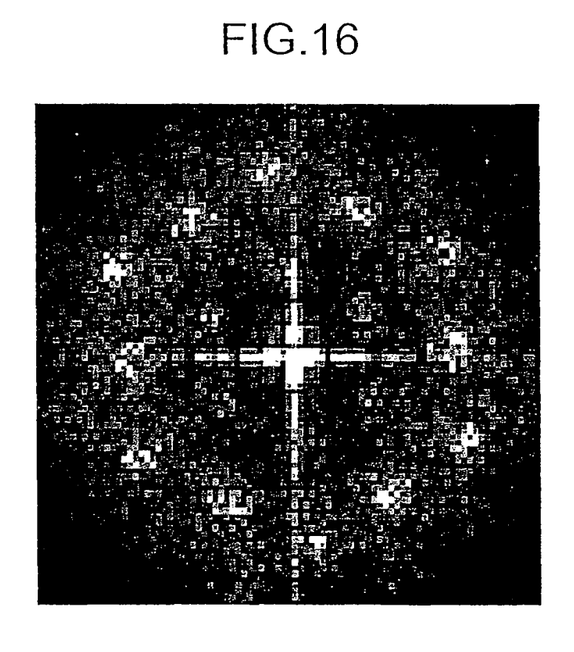
FIG. 16 is a photograph showing a Fourier transform image of a shaped article of the invention.

The plastic film obtained was placed in the manner shown in FIG. 9 and diffraction pattern evaluation was performed by directing a 532 nm laser beam on to it in the direction of film thickness. As shown in FIG. 14, a diffraction pattern was observed that was attributable to the presence of 2-micron diameter cylindrical structure bodies arrayed in a hexagonal lattice at a period of 5 microns within the plane of the polymer perpendicular to the thickness direction. In addition, an image of the obtained plastic film taken with a polarization microscope is shown in FIG. 15. As can be seen from the Fourier transform image of the polarization microscope image shown in FIG. 16, a pattern attributable to the arraying of the cylindrical structure bodies in a hexagonal lattice was observed.

Example 2

The photopolymerizable composition used was prepared by dissolving 1 part by mass of 2-benzyl-2-dimethylamino-1-(4-morpho-lenophenyl) butanone in 100 parts by mass of pentaerythritol tetraacrylate having a refractive index of 1.537 as an independent polymer.

An ultraviolet beam having a beam spread angle of ±0.001 rad and an illumination distribution in its optical intensity distribution in the plane perpendicular to the direction of light travel of not greater than 2.0% was directed onto the photopolymerizable composition, thereby polymerization-curing it into a plastic film.

The light source used was a parallel ray ultraviolet irradiator equipped with an ultra-high pressure mercury lamp having an emission spectrum like that shown in FIG. 13. An ultraviolet beam of 100 nm full width at half maximum and 250 to 400 nm wavelength was obtained for use by means of an ultraviolet pass filter.

The diffraction pattern of the obtained plastic film was evaluated in the manner of Example 1. Similarly to in Example 1, a diffraction pattern was obtained that was attributable to the presence of 2-micron diameter cylindrical structure bodies arrayed in a hexagonal lattice at a period of 6 microns within the plane of the polymer perpendicular to the thickness direction.

Comparative Example 1

The photopolymerizable composition used was prepared by dissolving 1 part by mass of 2-benzyl-2-dimethylamino-1-(4-morpho-lenophenyl) butanone as photopolymerization initiator in 100 parts by mass of trimethylolpropane triacrylate having a refractive index of 1.535 as an independent polymer.

A parallel ray ultraviolet irradiator equipped with an ultra-high pressure mercury lamp having an emission spectrum like that shown in FIG. 13 was used. An ultraviolet beam having a beam spread angle of not greater than ±0.001 rad and an illumination distribution in its optical intensity distribution in the plane perpendicular to the direction of light travel of not greater than 2.0% was directed onto a glass cell charged with the photopolymerizable composition without passing it through an optical filter or the like, thereby producing a plastic film.

Figure 17:
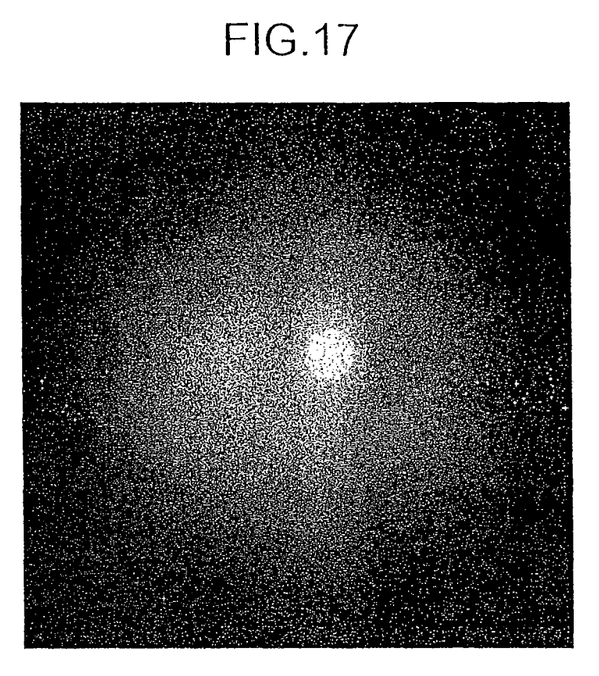
FIG. 17 is a photograph showing a light-scattering image observed for the shaped article of a comparative example.
Figure 18:
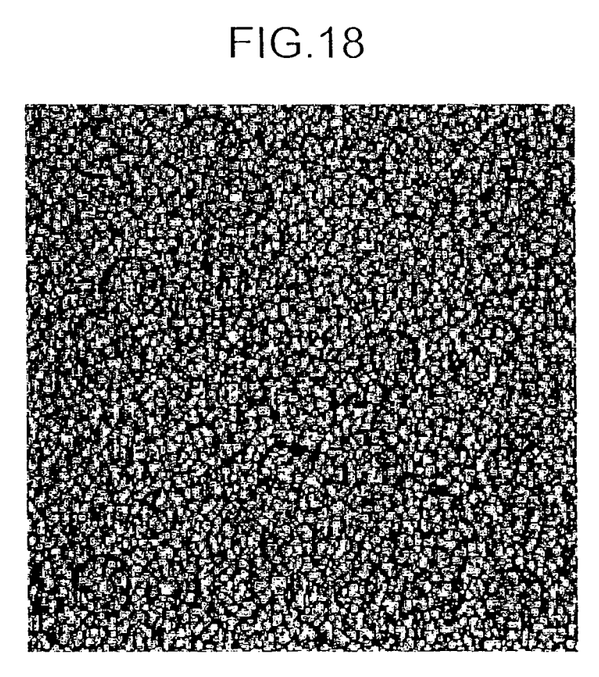
FIG. 18 is a photograph showing a polarization microscope image of the shaped article of the comparative example.

The diffraction pattern of the obtained plastic film was evaluated in the manner of Example 1. The light-scattering image shown in FIG. 17 was obtained and no characteristic pattern was observed. An image of the obtained plastic film taken with a polarization microscope is shown in FIG. 18. The Fourier transform image of the polarization microscope image also did not show any characteristic pattern.

The invention claimed is:

1. A method of producing a shaped article for use as an optical component comprising:
    a step of injecting into a cell a photopolymerizable composition containing a multifunctional monomer or oligomer comprising two or more functions and a photopolymerization initiator; and
    a step of directing parallel rays from a surface-emitting light source onto the photopolymerizable composition so polymerization of the photopolymerizable composition uniformly proceeds in a plane normal to a thickness direction of the photopolymerizable composition, thereby polymerization-curing the photopolymerizable composition to form a shaped article for use as an optical component composed of a matrix and numerous columnar structure bodies arrayed in one direction within the matrix, wherein the full width at half maximum of the parallel rays is not greater than 100 nm, the parallelism of the rays is such that the beam spread angle is not greater than +/−0.03 rad, and the wavelength of the rays is 250 to 400 nm.

2. The method according to claim 1, wherein the optical intensity distribution of the parallel rays is substantially constant.

3. The method according to claim 1, wherein the composition, when exposed to a laser beam, produces a diffraction pattern exhibiting the influence of a periodic change in refractive index imparted to the shaped article.

4. The method according claim 1, wherein the arrayed columnar structure bodies have an array periodicity of not less than 80 nm and not greater than 1,000 micrometers.

5. The method according to claim 4, wherein the optical intensity distribution of the parallel rays is substantially constant.

6. The method according to claim 1, wherein said columnar structure bodies are substantially the same size.

7. The method according to claim 1, wherein the arrayed columnar structure bodies differ in refractive index from the matrix and are arrayed in a lattice in a plane perpendicular to the orientation direction to have a highly arrayed structure whose refractive index periodically changes on the order of 80 nm to 1,000 micrometers.

8. The method according to claim 1, wherein the full width at half maximum of the parallel rays is not greater than 20 nm.

9. A method of producing a shaped article for use as an optical component comprising:
    a step of injecting into a cell a photopolymerizable composition containing a multifunctional monomer or oligomer comprising two or more functions and a photopolymerization initiator and sealing the composition, in the shape of a film, within the cell; and
    a step consisting essentially of forming a shaped article for use as an optical component composed of a matrix and numerous columnar structure bodies arrayed in one direction within the matrix by directing parallel rays onto the photopolymerizable composition within the cell to polymerize and cure the photopolymerizable composition, provided that the full width at half maximum of the parallel rays is not greater than 100 nm, wherein the parallel rays are directed from a surface-emitting light source onto the photopolymerizable composition so polymerization of the photopolymerizable composition uniformly proceeds in a plane normal to a thickness direction of the photopolymerizable composition that is in the shape of a film.

10. The method according to claim 1, wherein the method further comprises measuring the optical intensity at multiple points in an area of the polymerizable composition that is exposed to the parallel rays to obtain an illumination distribution ID according to the formula:

$$ID = ((\text{maximum value} - \text{minimum value})/(\text{maximum value} + \text{minimum value})) \times 100\%.$$

11. The method according to claim 10, wherein the illumination distribution is not greater than 2%.

12. The method according to claim 10, wherein the illumination distribution is not greater than 1%.

13. The method according to claim 9, wherein the method further comprises measuring the optical intensity at multiple points in an area of the polymerizable composition that is exposed to the parallel rays to obtain an illumination distribution ID according to the formula:

$$ID = ((\text{maximum value} - \text{minimum value})/(\text{maximum value} + \text{minimum value})) \times 100\%.$$

14. The method according to claim 13, wherein the illumination distribution is not greater than 2%.

15. The method according to claim 13, wherein the illumination distribution is not greater than 1%.

16. A method of producing a shaped article for use as an optical component comprising:
- a step of injecting into a cell a photopolymerizable composition containing a multifunctional monomer or oligomer comprising two or more functions and a photopolymerization initiator and sealing the composition, in the shape of a film, within the cell; and
- a step consisting essentially of forming a shaped article for use as an optical component composed of a matrix and numerous columnar structure bodies arrayed in one direction within the matrix by directing parallel rays onto the photopolymerizable composition within the cell to polymerize and cure the photopolymerizable composition, provided that the full width at half maximum of the parallel rays is not greater than 100 nm, wherein the parallel rays are directed from a surface-emitting light source onto the photopolymerizable composition so polymerization of the photopolymerizable composition proceeds, provided that an illumination distribution ID of not more than 2% is obtained in an area exposed to the parallel rays, said ID being obtained by measuring the optical intensity at multiple points in an area of the polymerizable composition that is exposed to the parallel rays, wherein the ID is according to the formula:

$$ID = ((\text{maximum value} - \text{minimum value})/(\text{maximum value} + \text{minimum value})) \times 100\%.$$

17. The method according to claim 16, wherein the illumination distribution is not greater than 1%.

* * * * *